(12) United States Patent
Sugiyama

(10) Patent No.: US 7,801,400 B2
(45) Date of Patent: Sep. 21, 2010

(54) MANUFACTURING METHOD OF OPTICAL DEVICE AND OPTICAL DEVICE

(75) Inventor: Masaki Sugiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/400,878

(22) Filed: Mar. 10, 2009

(65) Prior Publication Data

US 2009/0324165 A1 Dec. 31, 2009

(30) Foreign Application Priority Data

Jun. 30, 2008 (JP) .............................. 2008-170458

(51) Int. Cl.
*G02B 6/26* (2006.01)
(52) U.S. Cl. .............................. 385/32; 385/44; 385/45
(58) Field of Classification Search .................. 385/32, 385/44, 45
See application file for complete search history.

(56) References Cited

U.S. PATENT DOCUMENTS

| | | | | |
|---|---|---|---|---|
| 5,377,285 A | * | 12/1994 | Podgorski | 385/27 |
| 5,612,086 A | | 3/1997 | Hakogi | 427/163.2 |
| 5,782,883 A | * | 7/1998 | Kroll et al. | 607/14 |
| 5,790,583 A | * | 8/1998 | Ho | 372/92 |
| 7,088,875 B2 | * | 8/2006 | Sugiyama et al. | 385/3 |
| 7,262,902 B2 | * | 8/2007 | Burns et al. | 359/321 |
| 2004/0184755 A1 | | 9/2004 | Sugiyama | 385/129 |
| 2007/0189655 A1 | | 8/2007 | Miyata | 385/7 |
| 2008/0019651 A1 | * | 1/2008 | Sugiyama | 385/129 |
| 2009/0028492 A1 | * | 1/2009 | Wu et al. | 385/14 |

FOREIGN PATENT DOCUMENTS

| | | |
|---|---|---|
| JP | 6-250399 | 9/1994 |
| JP | H 6-250399 A | 9/1994 |
| JP | 2004-287093 | 10/2004 |
| JP | 2004-287093 A | 10/2004 |
| JP | 2005-331885 | 12/2005 |
| JP | 2005-331885 A | 12/2005 |
| WO | 94/10592 | 5/1994 |
| WO | WO 94/10592 | 5/1994 |

* cited by examiner

*Primary Examiner*—Charlie Peng
(74) *Attorney, Agent, or Firm*—Staas & Halsey LLP

(57) ABSTRACT

A method of manufacturing an optical device involves forming patterns on a dielectric substrate. The patterns include a waveguide pattern having a folded part, a conductor pattern positioned on an outer peripheral side of the folded part, and a dummy pattern that connects the folded part and the conductor pattern. The method further involves performing heat diffusion processing on the dielectric substrate on which the patterns have been formed at the forming, to make the waveguide pattern into an optical waveguide.

17 Claims, 17 Drawing Sheets

MANUFACTURING METHOD OF OPTICAL DEVICE AND OPTICAL DEVICE

CROSS REFERENCE TO RELATED APPLICATIONS

This application is based upon and claims the benefit of priority of the prior Japanese Patent Application No. 2008-170458, filed on Jun. 30, 2008, the entire contents of which are incorporated herein by reference.

FIELD

The embodiments discussed herein are related to a manufacturing method of an optical device and an optical device.

BACKGROUND

An optical device using a dielectric substrate of an electrooptical crystal such as lithium niobate ($LiNbO_3$) and lithium tantalite ($LiTaO_3$) is manufactured by forming an optical waveguide by forming a metal film of titanium (Ti) on a part of the crystal substrate and causing heat diffusion, or by causing proton exchange in benzoic acid after patterning, and then by arranging electrodes near the optical waveguide.

In such an optical device, an optical waveguide has, for example, a branching unit that branches a light beam, parallel waveguides that respectively transmit each branch of light beam, and a combining unit that combines the respective branches of the light beam transmitted by the parallel waveguides. Further, a signal electrode and a ground electrode are provided along the parallel waveguides, and a coplanar electrode is formed. When a Z-cut substrate is used as the dielectric substrate, a signal electrode is arranged on the optical waveguide along the waveguide, to utilize a change of refractive index caused by an electric field in the Z direction.

When the optical modulator is driven at a high speed, ends of the signal electrode and the ground electrode are connected through a resistor to form a traveling-wave electrode, and a microwave signal is applied from an input side of the signal electrode. Thus, the respective refractive indexes of the parallel waveguides change as $+\Delta na$ and $-\Delta nb$ by the electric field, and the phase difference between the parallel waveguides changes. Interference of each light beam at the combining unit is Mach-Zehnder interference, and an intensity-modulated optical signal is output from the combining unit.

Two units of such optical modulators are connected in series, and one of them is driven by a clock signal, and the other is driven by a non return to zero (NRZ) data signal, thereby generating a return to zero (RZ) signal. Moreover, a configuration in which two modulators are integrated on a signal chip using a folded waveguide has been proposed. At a part of the folded waveguide, by arranging a groove along an outer periphery of a U-shaped waveguide, loss of light can be suppressed (for example, Japanese Laid-Open Patent Publication No. 2004-287093).

Dielectric substrates using $LiNbO_3$ or $LiTaO_3$ have considerably high pyroelectric effect. Accordingly, a pyroelectric charge is generated when the temperature of a dielectric substrate changes, and the surface of the dielectric substrate is charged to generate a high electric potential. Therefore, when a metal pattern of Ti or the like is diffused on the surface of the dielectric substrate by applying heat, the large amount of pyroelectric charge generated is likely to be built up in the metal pattern (waveguide pattern). As a result, electrical discharge occurs in the metal pattern, breaking the optical waveguide pattern.

As a measure against this problem, a technique is disclosed in which an end of a waveguide pattern to be an optical waveguide is connected to a conductor pattern having a relatively large area (for example, International Publication Pamphlet No. 94/010592). With such a configuration, pyroelectric charge built up in the waveguide pattern escapes to the conductor pattern, thereby suppressing damage of the optical waveguide by electrical discharge.

However, in the conventional technique described above, if the optical waveguide has a folded part, the folded part and the conductor pattern to let the pyroelectric charges escape are distanced. Therefore, when a heat diffusion processing is performed, charge density differs between the folded part and the conductor pattern, and an electric potential difference is generated between the folded part and the conductor pattern. When this difference becomes large, electrical discharge occurs between the folded part and the conductor pattern, and as a result, a part of the optical waveguide around the folded part is damaged.

SUMMARY

According to an aspect of an embodiment, a method of manufacturing an optical device includes forming patterns on a dielectric substrate, where the patterns include a waveguide pattern having a folded part, a conductor pattern positioned on an outer peripheral side of the folded part, and a dummy pattern that connects the folded part and the conductor pattern; and performing heat diffusion processing on the dielectric substrate on which the patterns have been formed at the forming, to make the waveguide pattern into an optical waveguide.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT(S)

Preferred embodiments of the present invention will be explained with reference to the accompanying drawings.

Figure 1:
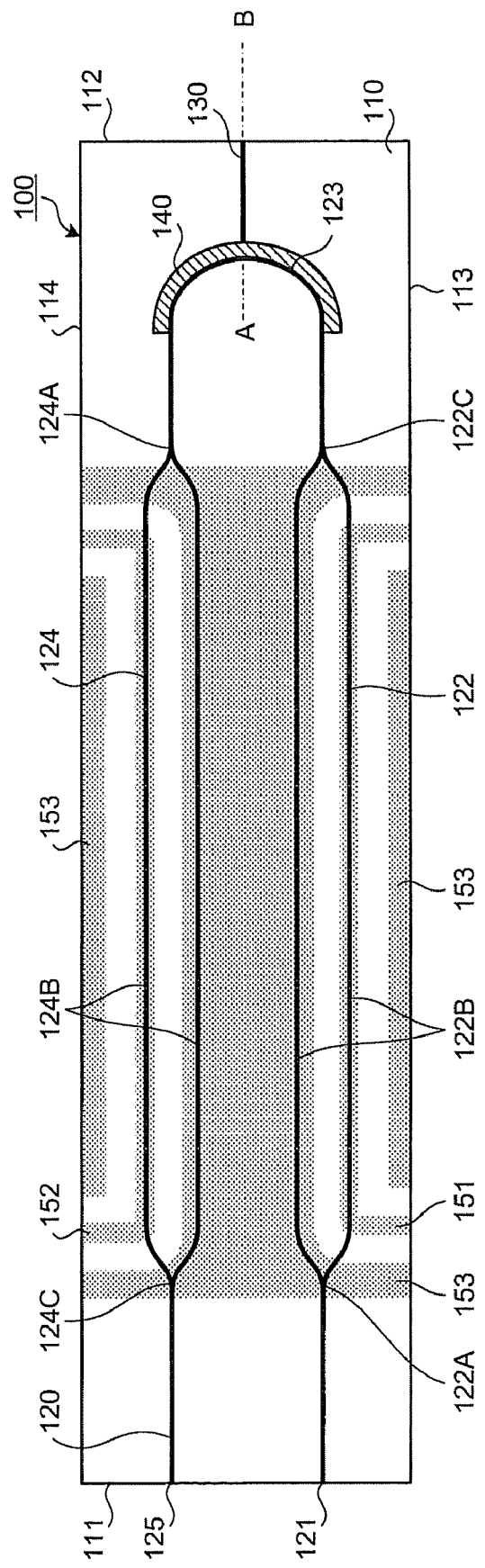
FIG. 1 is a plan view of an optical device according to a first embodiment of the present invention.

FIG. 1 is a plan view of an optical device according to a first embodiment of the present invention. As depicted in FIG. 1, an optical device 100 according to the first embodiment includes a dielectric substrate 110, an optical waveguide 120, a dummy waveguide 130, a groove 140, signal electrodes 151 and 152, and a ground electrode 153. The optical device 100 is an optical modulator that modulates light.

The dielectric substrate 110 is a dielectric substrate having pyroelectricity. The dielectric substrate 110 is a crystal substrate of $LiNbO_3$ or $LiTaO_3$, for example. In this example, the dielectric substrate 110 is a Z-cut $LiNbO_3$ substrate. The dielectric substrate 110 is formed in a chip form. Ends of the dielectric substrate 110 in a longitudinal direction are referred to as an end 111 and an end 112, respectively. Sides of the dielectric substrate 110 are referred to as a side 113 and a side 114, respectively.

The optical waveguide 120 is formed on the dielectric substrate 110. The optical waveguide 120 includes an input terminal 121, a first modulating unit 122, a folded part 123, a second modulating unit 124, and an output terminal 125. The input terminal 121 and the output terminal 125 are laid to the end 111 of the dielectric substrate 110. To the input terminal 121, light is input. The light input to the input terminal 121 is, for example, continuous light. The input terminal 121 transmits the input light to the first modulating unit 122.

The first modulating unit 122 includes a branching unit 122A, parallel waveguides 122B that respectively transmit branches of the light beam branched by the branching unit 122A, and a combining unit 122C that combines the respective branches transmitted by the parallel waveguides 122B. The light combined by the combining unit 122C of the first modulating unit 122 is transmitted to the folded part 123.

The folded part 123 is arranged near the end 112 of the dielectric substrate 110. The folded part 123 is a curved waveguide having a predetermined curvature radius. The folded part 123 folds the light emitted from the first modulating unit 122 by 180 degrees and transmits the light to the second modulating unit 124.

The second modulating unit 124 includes a branching unit 124A that branches the light transmitted from the folded part 123, parallel waveguides 124B that respectively transmit branches of the light beam branched by the branching unit 124A, and a combining unit 124C that combines the respective branches transmitted by the parallel waveguides 124B. The light combined by the combining unit 124C of the second modulating unit 124 is transmitted to the output terminal 125.

The output terminal 125 outputs the light transmitted from the second modulating unit 124. The groove 140 is arranged on a surface of the dielectric substrate 110 along an outer periphery of the folded part 123 of the optical waveguide 120. The groove 140 is formed by, for example, etching. The dummy waveguide 130 is laid from the groove 140 to the end 112 of the dielectric substrate 110.

The signal electrodes 151 and 152 and the ground electrode 153 are formed on the surface of the dielectric substrate 110 on which the optical waveguide 120 is formed. The signal electrode 151 is arranged on the dielectric substrate 110 along one of the parallel waveguides 122B. Both ends of the signal electrode 151 are led to the side 113 of the dielectric substrate 110.

The signal electrode 152 is arranged on the dielectric substrate 110 along one of the parallel waveguides 124B of the second modulating unit 124. Both ends of the signal electrode 152 are led to the side 114 of the dielectric substrate 110. The ground electrode 153 is arranged so as to encompass the signal electrodes 151 and 152. Moreover, the ground electrode 153 is formed so as to keep a predetermined interval (gap) from the signal electrodes 151 and 152.

Data is input, by a microwave signal, to the signal electrode 151 at an end thereof nearest the input terminal 121. Thus, light passing through the first modulating unit 122 is intensity-modulated. A clock signal is input to the signal electrode 152 at an end thereof nearest the folded part 123. Thus, light passing through the second modulating unit 124 is RZ-modulated. Hence, light output from the output terminal 125 is an optical signal that has been subjected to intensity modulation and RZ modulation.

Although not depicted, between the surface of the dielectric substrate 110 and the signal electrodes 151, 152 and the ground electrode 153, a buffer layer is arranged. The buffer layer is, for example, silicon dioxide ($SiO_2$) having a thickness of approximately 0.2 μm to 2 μm to help prevent light passing through the optical waveguide 120 from being absorbed by the signal electrodes 151 and 152, and the ground electrode 153.

Figure 2:
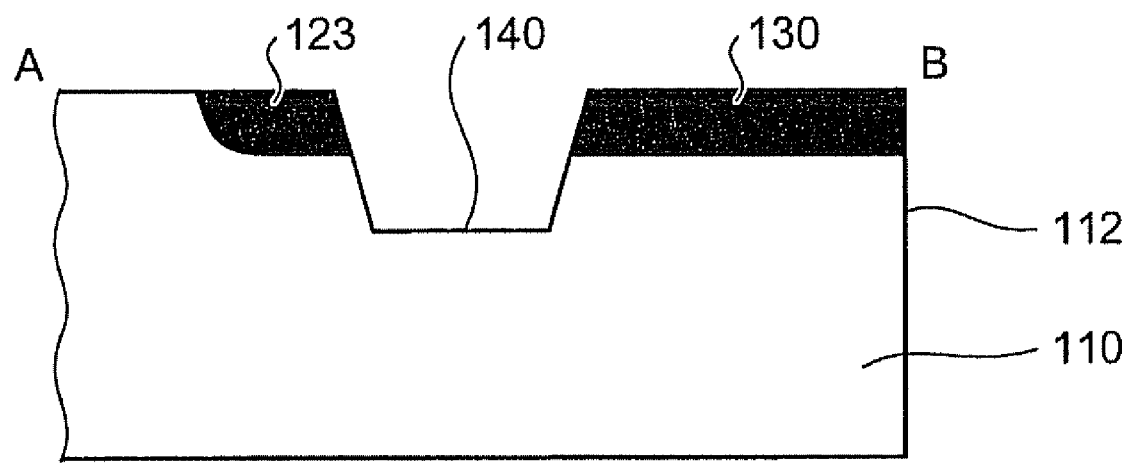
FIG. 2 is a cross-section taken along a line A-B depicted in FIG. 1.

FIG. 2 is a cross-section taken along a line A-B depicted in FIG. 1. In FIG. 2, structures identical to those depicted in FIG. 1 are given the same reference numerals, and explanation therefor is omitted. As depicted in FIG. 2, the outer periphery of the folded part 123 is edged with the groove 140. The groove is formed deeper than the folded part 123 and the dummy waveguide 130 in the dielectric substrate 110.

For example, when a mode field diameter of the folded part 123 and the dummy waveguide 130 in the dielectric substrate 110 is 3 μm, the depth of the groove 140 is to be deeper than 3 μm. Thus, the optical waveguide 120 and the dummy waveguide 130 are separated, thereby preventing light passing through the folded part 123 from leaking into the dummy waveguide 130, and optical loss can be reduced.

Figure 3:
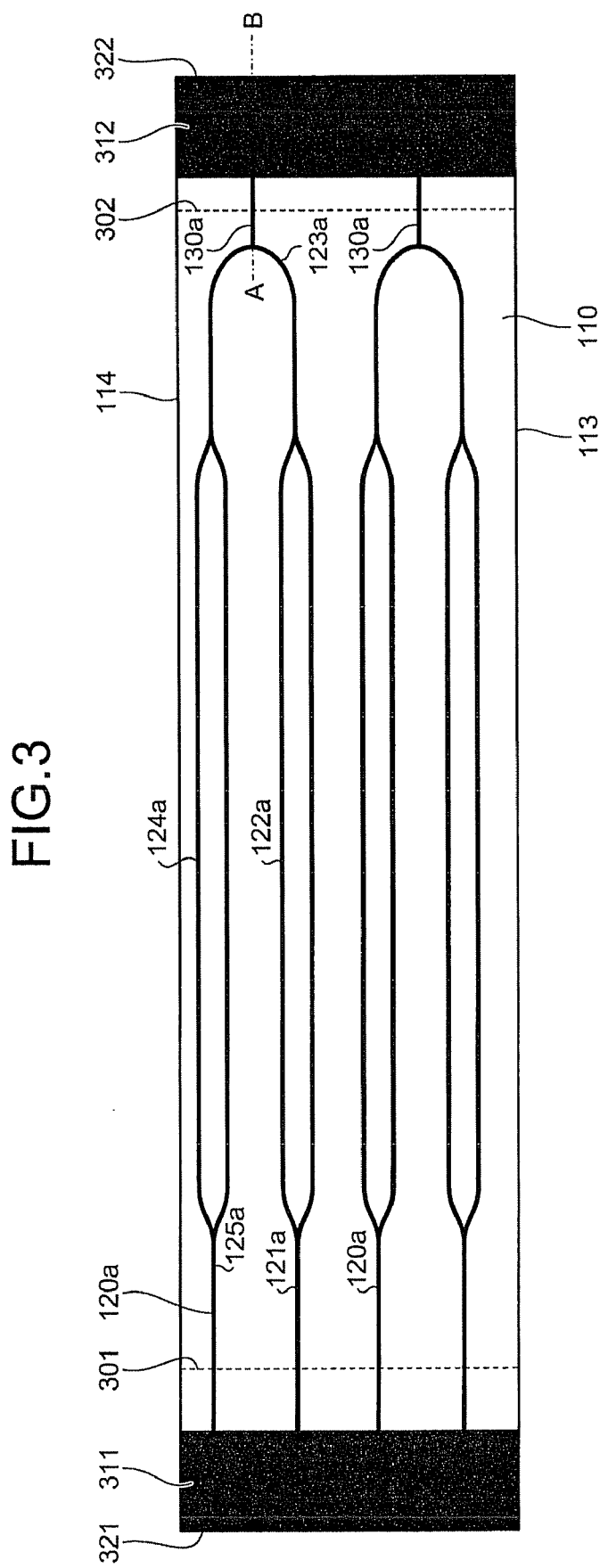
FIG. 3 is a plan view depicting a manufacturing process (part 1) of the optical device depicted in FIG. 1.

FIG. 3 is a plan view depicting a manufacturing process (part 1) of the optical device depicted in FIG. 1. In FIG. 3, structures identical to those depicted in FIG. 1 are given the same reference numerals, and explanation therefor is omitted. A dotted line 301 on the dielectric substrate 110 is a position corresponding to the end 111 depicted in FIG. 1. A dotted line 302 on the dielectric substrate 110 is a position corresponding to the end 112 depicted in FIG. 1.

First, on the surface of the dielectric substrate 110, waveguide patterns 120a, a conductor patterns 311 and 312, and dummy patterns 130*a* are formed. The waveguide patterns 120*a*, the conductor patterns 311 and 312, and the dummy patterns 130*a* are formed, for example, by patterning Ti on the dielectric substrate 110.

The waveguide patterns 120*a* have a planar shape same as that of the optical waveguide 120 depicted in FIG. 1. The waveguide patterns 120*a* include an input unit 121*a*, a first modulating unit 122*a*, a folded part 123*a*, a second modulating unit 124*a*, and an output unit 125*a*. In this example, two waveguide patterns 120*a* are formed arrayed in a direction of width (direction of a short side) of the dielectric substrate 110.

The conductor pattern 311 is formed at an end 321 that is nearest the dotted line 301 on the dielectric substrate 110, and is connected to respective input units 121*a* and output units 125*a* of the two waveguide patterns 120*a*. The conductor pattern 312 is formed at an end 322 that is nearest the dotted line 302 (i.e., an end nearest the outer periphery of the folded parts 123*a*) on the dielectric substrate 110. The conductor patterns 311 and 312 are solid patterns formed to have a sufficient area.

The dummy pattern 130*a* is a pattern having such a shape that a planar shape of the dummy waveguide 130 depicted in FIG. 1 is extended to the conductor pattern 312. The dummy patterns 130*a* are formed at the folded parts 123*a* of the two waveguide patterns 120*a*, respectively. The dummy pattern 130*a* is formed so as to connect the folded part 123*a* and the conductor pattern 312.

A heat diffusion processing is performed on the dielectric substrate 110 in this state. Thus, the waveguide patterns 120*a*, the conductor patterns 311 and 312, and the dummy patterns 130*a* are diffused on the surface of the dielectric substrate 110. The diffused waveguide patterns 120*a* are to be the optical waveguide 120 depicted in FIG. 1. Specifically, the input unit 121*a*, the first modulating unit 122*a*, the folded part 123*a*, the second modulating unit 124*a*, and the output unit 125*a* correspond to the input terminal 121, the first modulating unit 122, the folded part 123, the second modulating unit 124, and the output terminal 125, respectively.

Figure 4:
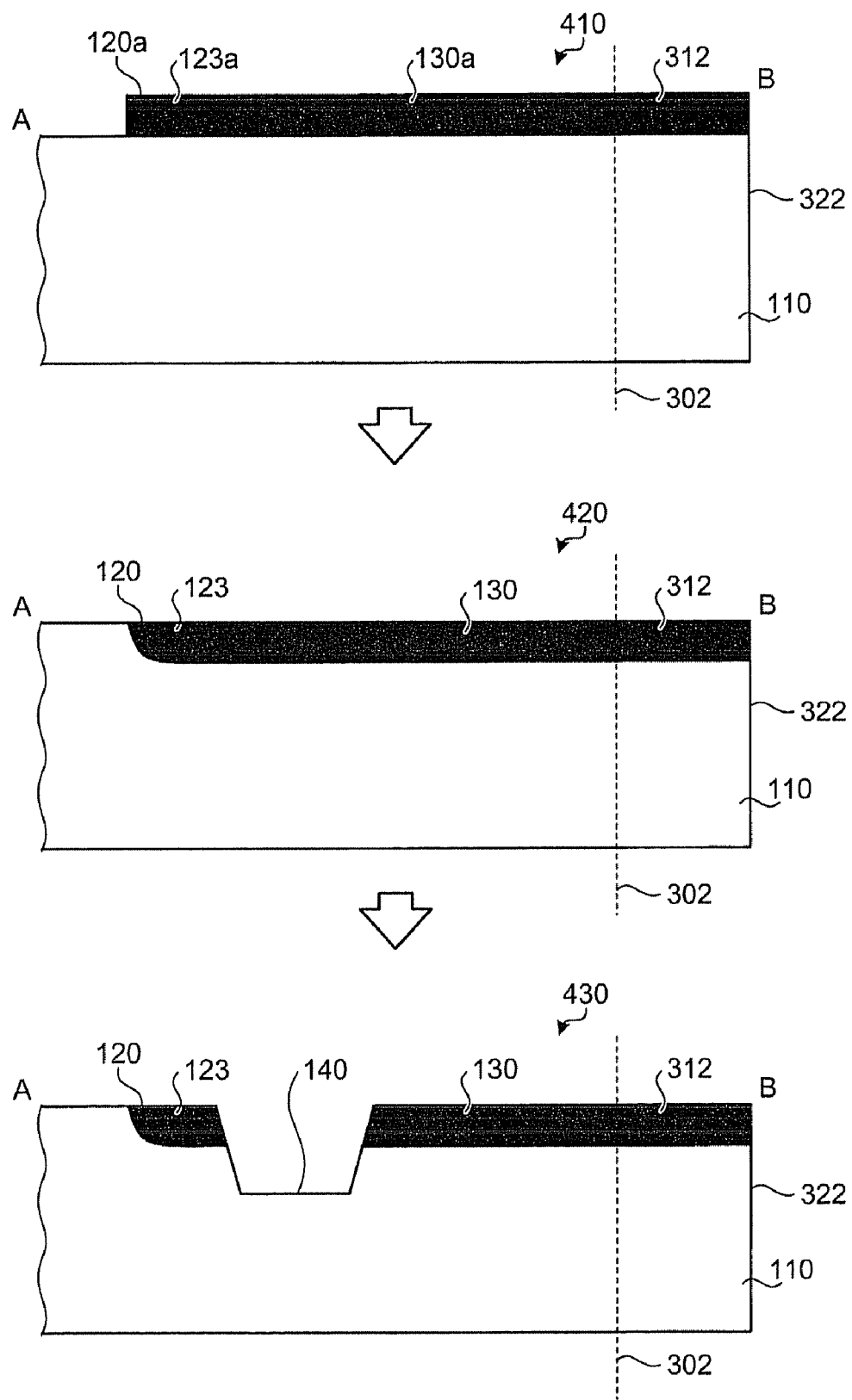
FIG. 4 is a view depicting a manufacturing process (part 2) of the optical device depicted in FIG. 1.

FIG. 4 is a view depicting a manufacturing process (part 2) of the optical device depicted in FIG. 1. In FIG. 4, structures identical to those depicted in FIG. 1 or FIG. 3 are given the same reference numeral, and explanation therefor is omitted. Numerals 410, 420, and 430 in FIG. 4 respectively indicate the cross-section taken along the line A-B in FIG. 3. The cross-section 410 depicts a state in which the waveguide pattern 120*a*, the conductor patterns 311 and 312, and the dummy pattern 130*a* are formed on the dielectric substrate 110 (see FIG. 3).

When heat diffusion processing is performed on the dielectric substrate 110 in the state depicted in the cross-section 410, as described above, the waveguide patterns 120*a*, the conductor patterns 311 and 312, and the dummy patterns 130*a* are diffused on the surface of the dielectric substrate 110. For example, as depicted in the cross-section 420, the diffused folded part 123*a* (see FIG. 3) is to be the folded part 123 depicted in FIG. 1.

Furthermore, the diffused dummy pattern 130*a* (see FIG. 3) is to be the dummy waveguide 130 depicted in FIG. 1. The pyroelectric charge built up at the folded part 123*a* by the pyroelectric effect of the dielectric substrate 110 in the process of performing the heat diffusion processing escapes to the conductor pattern 312 through the dummy pattern 130*a*. Therefore, damage of the optical waveguide 120 due to electrical discharge can be prevented.

Subsequently, as depicted in the cross-section 430, The groove 140 (see FIGS. 1 and 2) is arranged so as to separate the folded part 123 of the optical waveguide 120 and the dummy waveguide 130 (groove forming operation). Thereafter, the dielectric substrate 110 is cut at the positions of the dotted line 301 (see FIG. 3) and the dotted line 302, to remove the conductor patterns 311 and 312 (cutting operation).

Parts at which the dielectric substrate 110 is cut along the dotted lines 301 and 302 are to be the ends 11 and 112 depicted in FIG. 1, respectively. Further, the buffer layer is arranged on the surface of the dielectric substrate 110; and the signal electrodes 151 and 152, and the ground electrode 153 are formed on the buffer layer (electrode forming operation). Thus, the optical device 100 depicted in FIG. 1 can be manufactured.

As described, according to the manufacturing method of the optical device 100 according to the first embodiment, pyroelectric charge generated near the folded part 123*a* by the pyroelectric effect of the dielectric substrate 110 when the heat diffusion processing is performed on the dielectric substrate 110 on which the waveguide patterns 120*a* are formed escapes to the conductor pattern 312 through the dummy pattern 130*a*. Therefore, it is possible to prevent damage of the optical waveguide 120 caused by electrical discharge at the time of manufacture of the optical device 100.

In addition, by arranging the groove 140 along the outer periphery of the folded part 123, it is possible to reduce turning loss of light at the folded part 123 even if the curvature of the folded part 123 is great. Therefore, it is possible to prevent damage of the optical waveguide 120 caused by electrical discharge at the time of manufacture of the optical device 100 while achieving miniaturization of a device and reduction of optical loss.

Furthermore, because the folded part 123 and the dummy waveguide 130 can be separated by the groove 140, it is possible to prevent light passing through the folded part 123 from being combined with the dummy waveguide 130, and to reduce optical loss.

In this example, a case where the waveguide patterns 120*a*, the dummy patterns 130*a*, and the conductor patterns 311 and 312 are formed with an identical material, Ti, has been explained. This enables to form the respective patterns at one time by patterning. However, the waveguide patterns 120*a*, the dummy patterns 130*a*, and the conductor patterns 311 and 312 can be of materials different from each other.

Figure 5:
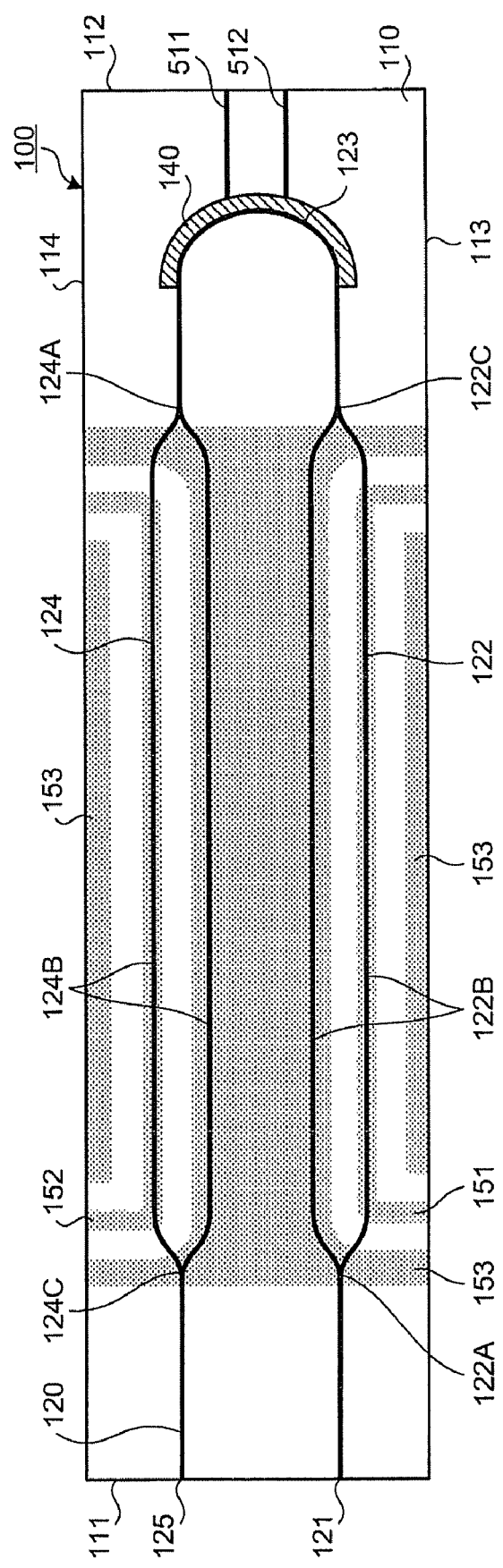
FIG. 5 is a plan view of an optical device according to a second embodiment.

FIG. 5 is a plan view of an optical device according to a second embodiment of the present invention. In FIG. 5, structures identical to those depicted in FIG. 1 are given the same reference numerals, and explanation therefor is omitted. As depicted in FIG. 5, the optical device 100 according to the second embodiment has plural dummy waveguides in place of the dummy waveguide 130 depicted in FIG. 1.

The optical device 100 has dummy waveguides 511 and 512. In a manufacturing method of this optical device 100, two dummy patterns having a planar shape identical to that of the dummy waveguides 511 and 512 are formed instead of the dummy pattern 130*a* (see FIG. 3).

Thus, pyroelectric charge built up at the folded part 123*a* by the pyroelectric effect of the dielectric substrate 110 in the process of performing the heat diffusion processing effectively escapes to the conductor pattern 312 (see FIG. 4) through the two dummy patterns. Furthermore, even if one of the two dummy patterns breaks, the pyroelectric charges escape to the conductor pattern 312 through a remaining dummy pattern. Therefore, damage of the optical waveguide 120 due to electrical discharge can be prevented more certainly.

Figure 6:
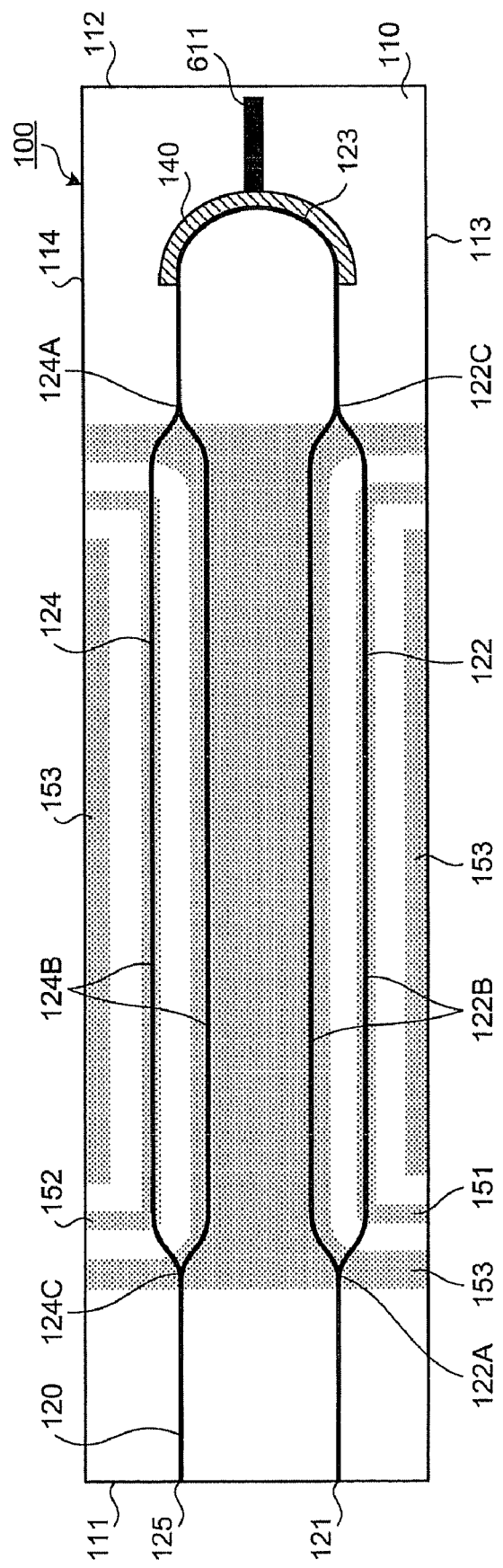
FIG. 6 is a first modification of the optical device depicted in FIG. 5.

FIG. 6 is a first modification of the optical device depicted in FIG. 5. In FIG. 6, structures identical to those depicted in FIG. 5 are given the same reference numerals, and explanation therefor is omitted. As depicted in FIG. 6, the optical device 100 according to the second embodiment can have a dummy waveguide 611 having a width greater than the optical waveguide 120, in place of the dummy waveguide 130 depicted in FIG. 1.

For example, when the width of the optical waveguide 120 is 10 μm, the dummy waveguide 611 is formed to have width greater than 10 μm. In the manufacturing method of the optical device 100, a dummy pattern having a planar shape identical to that of the dummy waveguide 611 is formed on the dielectric substrate 100 instead of the dummy pattern 130a (see FIG. 3).

Thus, pyroelectric charge built up at the folded part 123a by the pyroelectric effect of the dielectric substrate 110 in the process of performing the heat diffusion processing effectively escapes to the conductor pattern 312 (see FIG. 4) through the wide dummy pattern. Accordingly, it is possible to prevent such a state that the pyroelectric charge built up at the folded part 123a does not escape to the conductor pattern 312 because of breakage of the dummy pattern. Therefore, damage of the optical waveguide 120 due to electrical discharge can be prevented more certainly.

Figure 7:
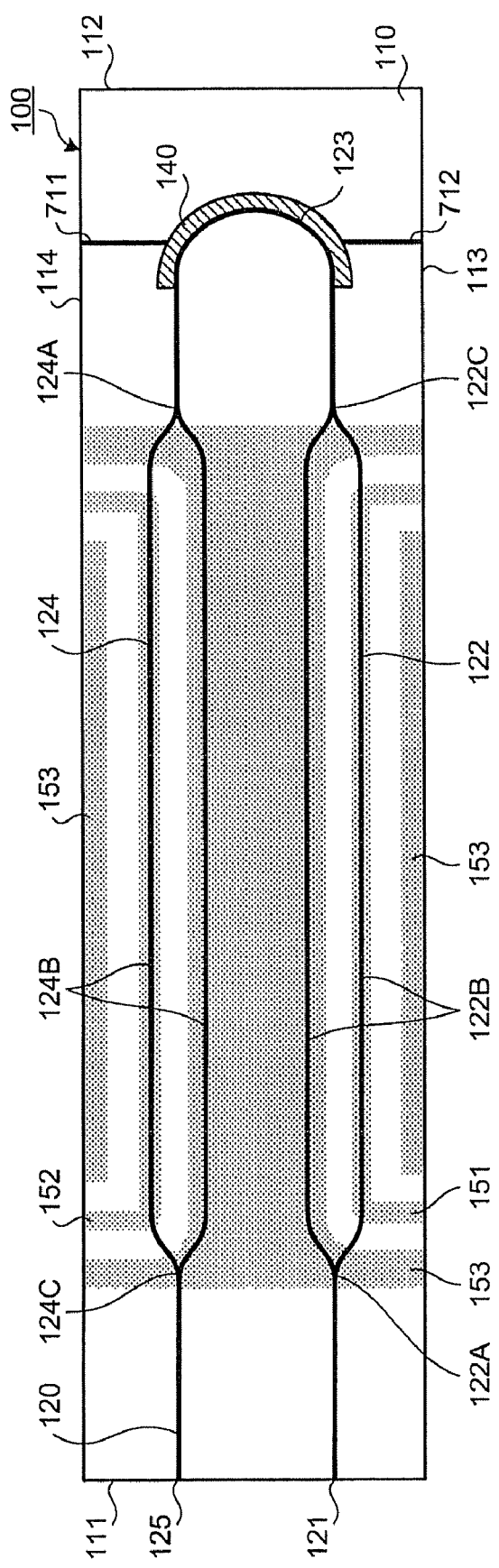
FIG. 7 is a second modification of the optical device depicted in FIG. 5.

FIG. 7 is a second modification of the optical device depicted in FIG. 5. In FIG. 7, structures identical those depicted in FIG. 5 are given the same reference numerals, and explanation therefor is omitted. As depicted in FIG. 7, the optical device 100 according to the second embodiment can have dummy waveguides 711 and 712 in place of the dummy waveguide 130 depicted in FIG. 1.

The dummy waveguide 711 is led to the side 114 of the dielectric substrate 110 from the groove 140. The dummy waveguide 712 is led to the side 113 of the dielectric substrate 110 from the groove 140. In a manufacturing method of this optical device 100, two dummy patterns having a planar shape identical to that of the dummy waveguides 711 and 712 are formed in place of the dummy pattern 130a (see FIG. 3) in the process of forming patterns.

Figure 8:
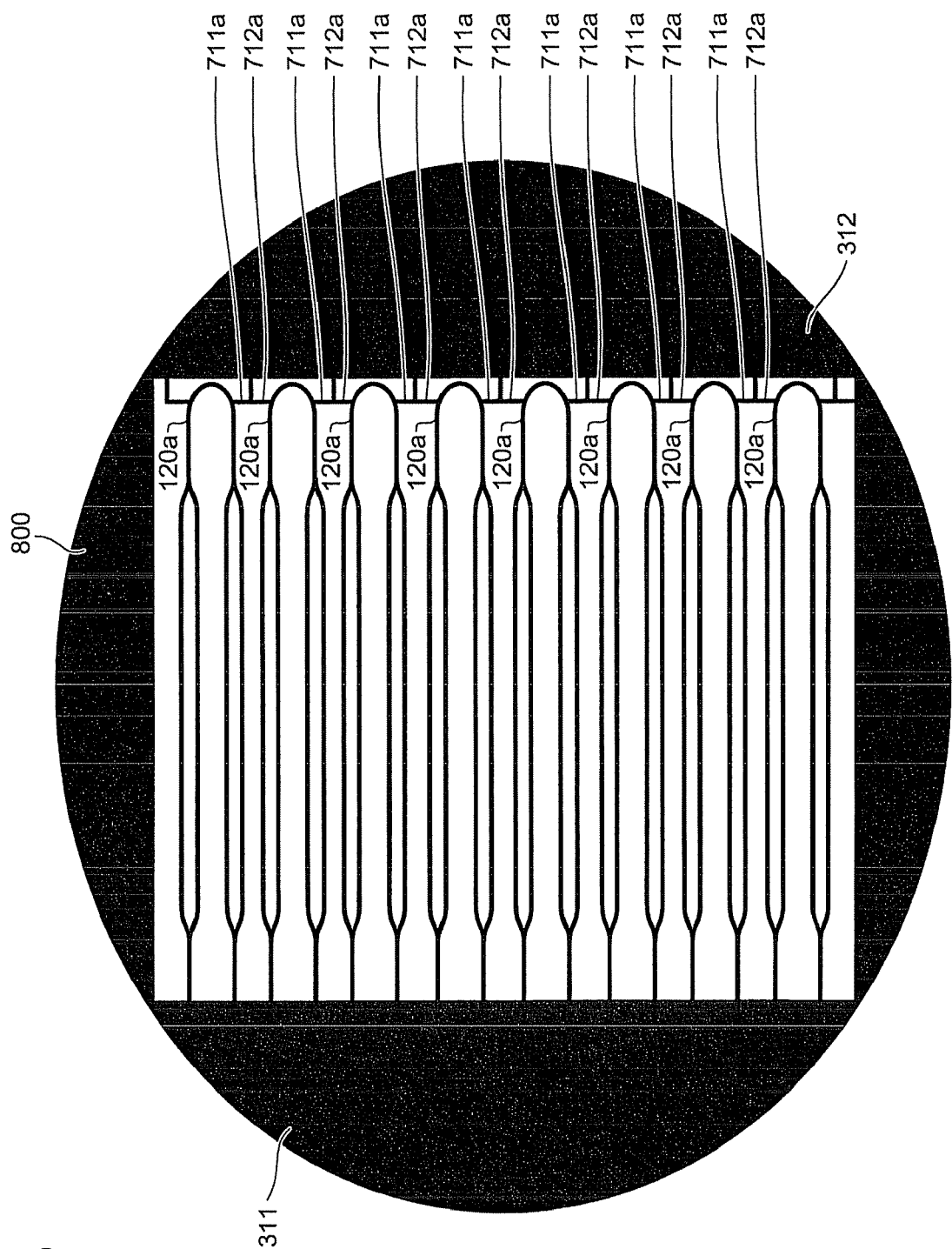
FIG. 8 is a plan view depicting a manufacturing process of the optical device depicted in FIG. 7.

FIG. 8 is a plan view depicting a manufacturing process of the optical device depicted in FIG. 7. In FIG. 8, structures identical to those depicted in FIG. 3 are given the same reference numerals, and explanation therefor is omitted. First, a thin film of Ti (black part in FIG. 8) is formed on the entire surface of a disk-shaped wafer 800. By etching the thin film of Ti, the waveguide patterns 120a, the conductor pattern 311 and 312, and dummy patterns 711a and 712a are formed.

In this example, the waveguide patterns 120a are arranged such that eight patterns are arrayed in a direction of a short side of the waveguide patterns 120a. The dummy patterns 711a and 712a are two dummy patterns having a planar shape identical to that of the dummy waveguides 711 and 712 (see FIG. 7). The dummy patterns 711a and 712a are formed at the folded part 123a of each of the eight waveguide patterns 120a.

The dummy pattern 711a connected to the waveguide pattern 120a is connected to the dummy pattern 712a connected to the waveguide pattern 120a adjacent thereto, and to the conductor pattern 312. The heat diffusion processing is then performed on the wafer 800. Thus, each of the waveguide patterns 120a, the conductor patterns 311 and 312, and the dummy patterns 711a and 712a respectively connected to the waveguide patterns 120a are diffused on the surface of the dielectric substrate 110.

The diffused waveguide patterns 120a are to be the optical waveguide 120 depicted in FIG. 7. The diffused dummy patterns 711a and 712a are to be the dummy waveguides 711 and 712 depicted in FIG. 7, respectively. The pyroelectric charge built up at the folded part 123a of each of the waveguide patterns 120a in the heat diffusion processing escapes to the conductor pattern 312 through the respective dummy patterns 711a and 712a.

Subsequently, the groove 140 (see FIG. 7) is arranged so as to separate the optical waveguide 120 and the dummy waveguides 711 and 712. Thereafter, the optical waveguides 120 are separated by cutting the wafer 800, thereby obtaining eight dielectric substrates 110 on which the optical waveguide 120, the dummy waveguides 711 and 712, and the groove 140 are formed. Further, the buffer layer is arranged respectively on the surface of the dielectric substrates 110, and the signal electrodes 151 and 152 and the ground electrode 153 are formed on the buffer layer. Thus, the optical device 100 depicted in FIG. 7 can be manufactured.

As described, according to the manufacturing method of the optical device 100 according to the second embodiment, the pyroelectric charge built up at the folded part 123a by the pyroelectric effect is effectively released to the conductor pattern 312 through the dummy patterns by forming plural dummy patterns or a dummy pattern having wide width in place of the dummy pattern 130a (see FIG. 3) in the pattern forming process, while receiving the effect of the manufacturing method of the optical device 100 according to the second embodiment. Therefore, damage of the optical waveguide 120 due to electrical discharge can be prevented more certainly.

Figure 9:
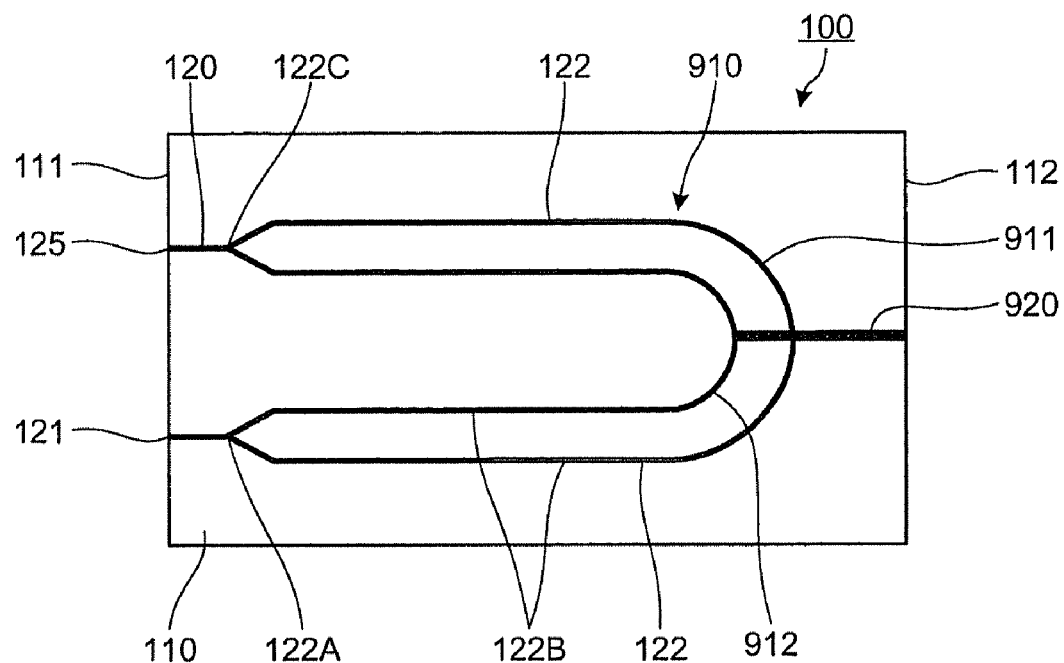
FIG. 9 is a plan view of a manufacturing process of an optical device according to a third embodiment.

FIG. 9 is a plan view of a manufacturing process of an optical device according to a third embodiment of the present invention. In FIG. 9, structures identical to those depicted in FIG. 1 are given the same reference numerals, and explanation therefor is omitted. As depicted in FIG. 9, in the optical device 100 according to the third embodiment, the waveguide pattern 120a includes the input terminal 121, the first modulating unit 122, and the output terminal 125. The combining unit 122C of the first modulating unit 122 is connected to the output terminal 125.

The parallel waveguides 122B of the first modulating unit 122 have folded parts 910 near the end 112 of the dielectric substrate 110. A portion of an outer waveguide among the parallel waveguides 122B and forming the folded part 910 is referred to as a folded waveguide 911. On the other hand, a portion of an inner waveguide among the parallel waveguides 122B and forming the folded part 910 is referred to as a folded waveguide 912.

In this example, the folded waveguides 911 and 912 are curved in a state where the folded waveguides 911 and 912 are parallel to each other. The dummy waveguide 920 is formed from the folded waveguide 912 to the end 112 crossing the folded waveguide 911. In the manufacturing method of this optical device 100, in place of the first modulating unit 122a depicted in FIG. 3, a pattern having a planar shape identical to that of the first modulating unit 122a depicted in FIG. 9 is formed on the dielectric substrate 110 in the pattern forming process.

Moreover, in place of the dummy pattern 130a (see FIG. 3), a dummy pattern having a planar shape identical to that of the dummy waveguide 920 is formed on the dielectric substrate 110. This dummy pattern is a conductor pattern that connects respective patterns to be the folded waveguides 911 and 912, and the conductor pattern 312 (see FIG. 3) arranged on the side of the end 112.

This enables the pyroelectric charge, built up at the respective patterns to be the folded waveguides 911 and 912 (see FIG. 4), to escape to the conductor pattern 312 (see FIG. 4) through the dummy pattern. Therefore, damage of the optical waveguide 120 due to electrical discharge can be prevented.

Figure 10:
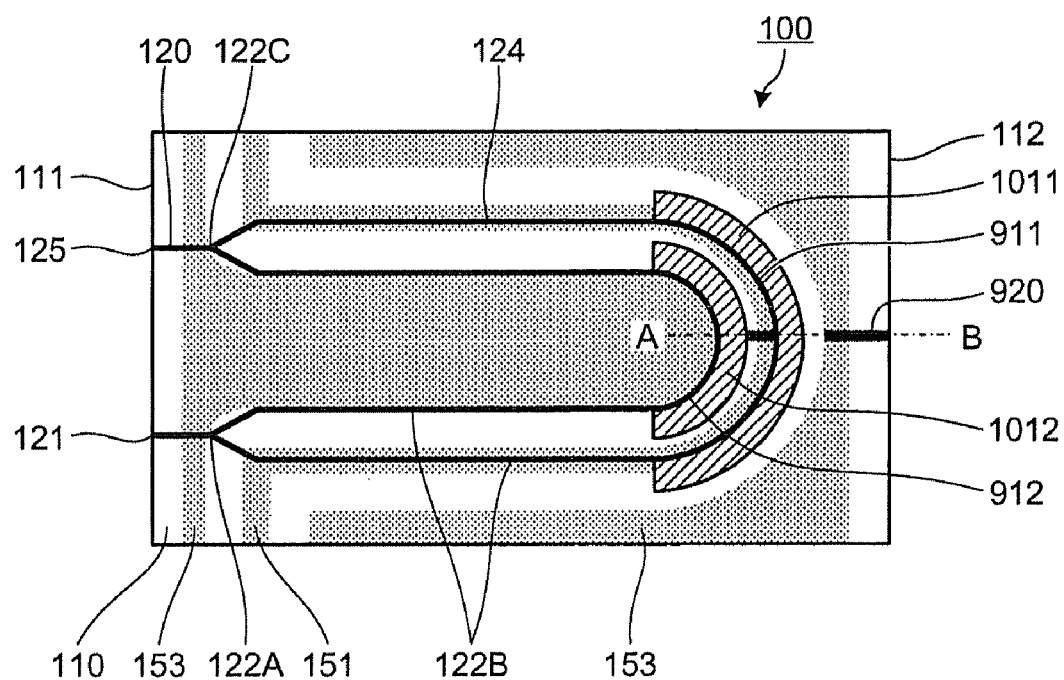
FIG. 10 is a plan view of the optical device according to the third embodiment.
Figure 11:
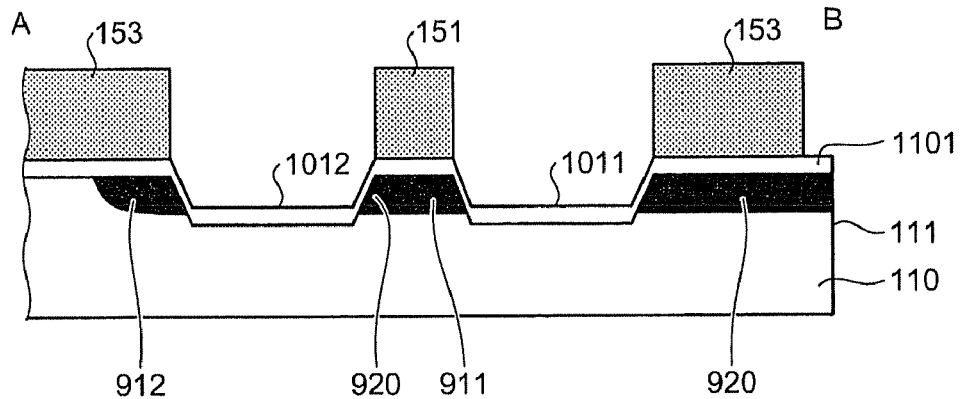
FIG. 11 is a cross-section taken along a line A-B depicted in FIG. 10.

FIG. 10 is a plan view of the optical device according to the third embodiment. FIG. 11 is a cross-section taken along a line A-B depicted in FIG. 10. In FIGS. 10 and 11, structures identical to those depicted in FIG. 9 are given the same reference numerals, and explanation therefor is omitted. With respect to the state depicted in FIG. 9, a groove 1011 (first groove) is formed on the dielectric substrate 110 along an outer periphery of the folded waveguide 911. Further, a groove 1012 (second groove) is formed along an outer periphery of the folded waveguide 912.

Subsequently, a buffer layer 1101 is arranged on the surface of the dielectric substrate 110, and the signal electrode 151 and the ground electrode 153 are formed on the buffer layer 1101. Thus, the optical device 100 depicted in FIG. 10 can be manufactured. In this optical device 100, the folded waveguides 911 and 912 that had been connected by the dummy waveguide 920 are separated by the groove 1012. Therefore, the groove 1012 and the folded waveguide 911 are connected by a part of the dummy waveguide 920 that is not cut away by the groove 1012.

Figure 12:
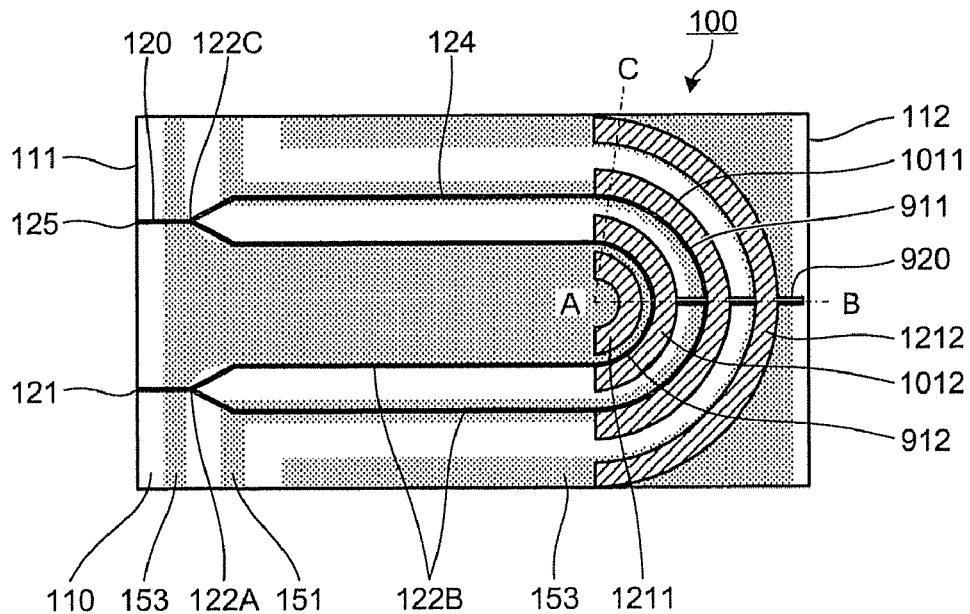
FIG. 12 is a plan view of a modification of the optical device depicted in FIG. 10.
Figure 13:
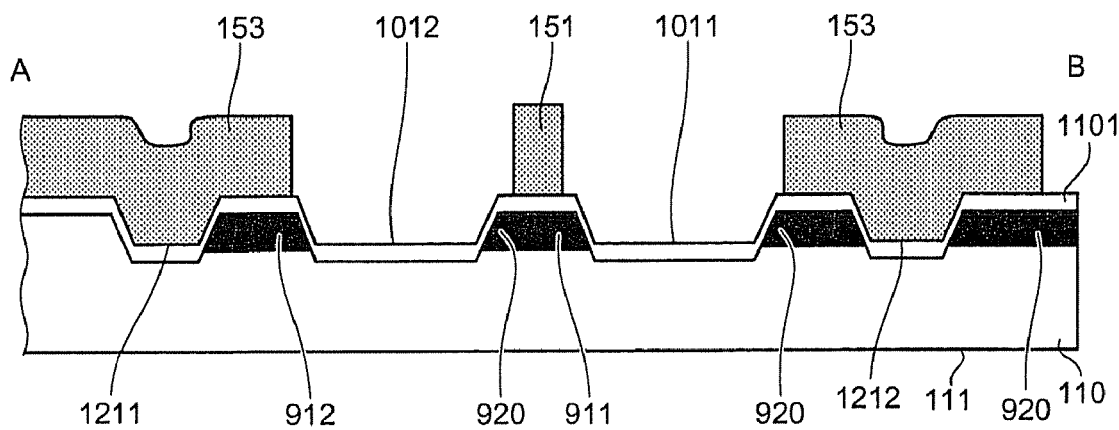
FIG. 13 is a cross-section taken along a line A-B depicted in FIG. 12.
Figure 14:
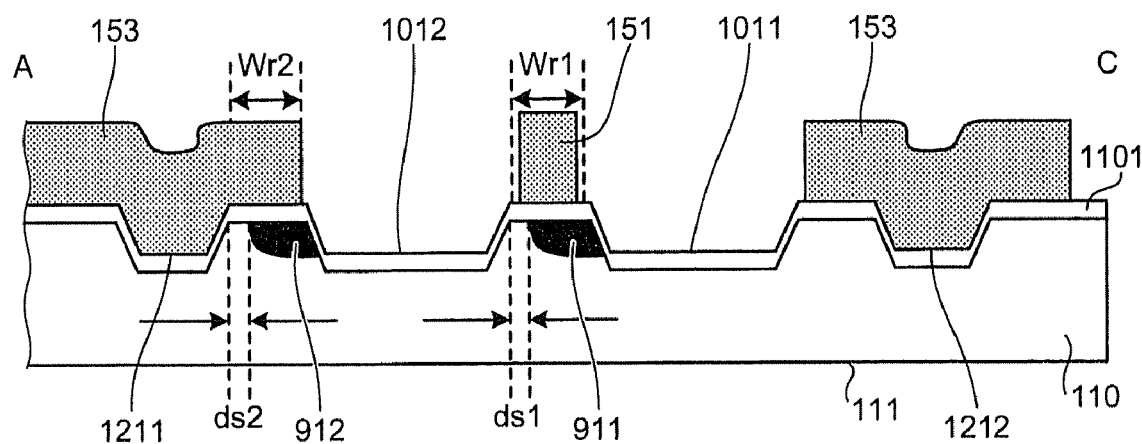
FIG. 14 is a cross-section taken along a line A-C depicted in FIG. 12.

FIG. 12 is a plan view of a modification of the optical device depicted in FIG. 10. FIG. 13 is a cross-section taken along a line A-B depicted in FIG. 12. FIG. 14 is a cross-section taken along a line A-C depicted in FIG. 12. In FIGS. 12 and 13, structures identical to those depicted in FIG. 10 are given the same reference numerals, and explanation therefor is omitted. As depicted in FIG. 12, in the optical device 100 according to the third embodiment, a groove 1211 (third groove) can be formed along an inner periphery of the folded waveguide 912.

Moreover, a groove 1212 can be formed along an outer periphery of the groove 1211 keeping an interval from the groove 1211. As depicted in FIG. 14, the groove 1211 is arranged in such a manner that a distance ds1 between the folded waveguide 911 and the groove 1012 and a distance ds2 between the folded waveguide 912 and the groove 1211 are equal to each other. Furthermore, the groove 1211 is arranged in such a manner that a distance Wr1 between the groove 1011 and the groove 1012 and a distance Wr2 between the groove 1012 and the groove 1211 are equal to each other.

Thus, the folded waveguides 911 and 912 can have the same cross-sectional shape. Therefore, optical loss through the folded waveguide 911 and optical loss through the folded waveguide 912 are equivalent to each other, and an extinction ratio of light interfered by the combining unit 122C can be improved. Accordingly, a property of a modulated optical signal can be improved.

Figure 15:
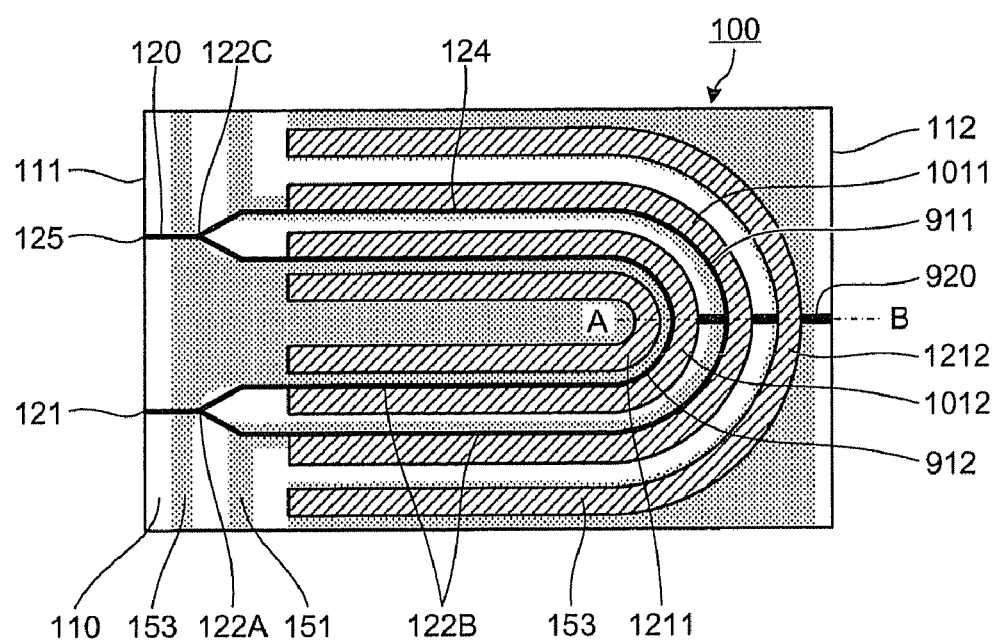
FIG. 15 is a plan view of a modification of the optical device depicted in FIG. 12.

FIG. 15 is a plan view of a modification of the optical device depicted in FIG. 12. In FIG. 15, structures identical to those depicted in FIG. 12 are given the same reference numerals, and explanation therefor is omitted. As depicted in FIG. 15, in the optical device 100 according to the third embodiment, each groove can be arranged in the entire interacting portion of the optical waveguide 120 and the signal electrode 151. Specifically, each of the grooves 1011, 1012, 1211, and 1212 is extended to a portion beyond the folded waveguides 911 and 912 of the optical waveguide 120.

The interacting portion of the optical waveguide 120 and the signal electrode 151 is a portion of the signal electrode 151, a portion that is along the optical waveguide 120. With such an arrangement, the characteristic impedance of the signal electrode 151 and the propagation speed of a microwave are made uniform through the entire interacting portion, and the high-frequency characteristic can be improved. A cross-section taken along a line A-B depicted in FIG. 15 is identical to the cross-section depicted in FIG. 13.

Figure 16:
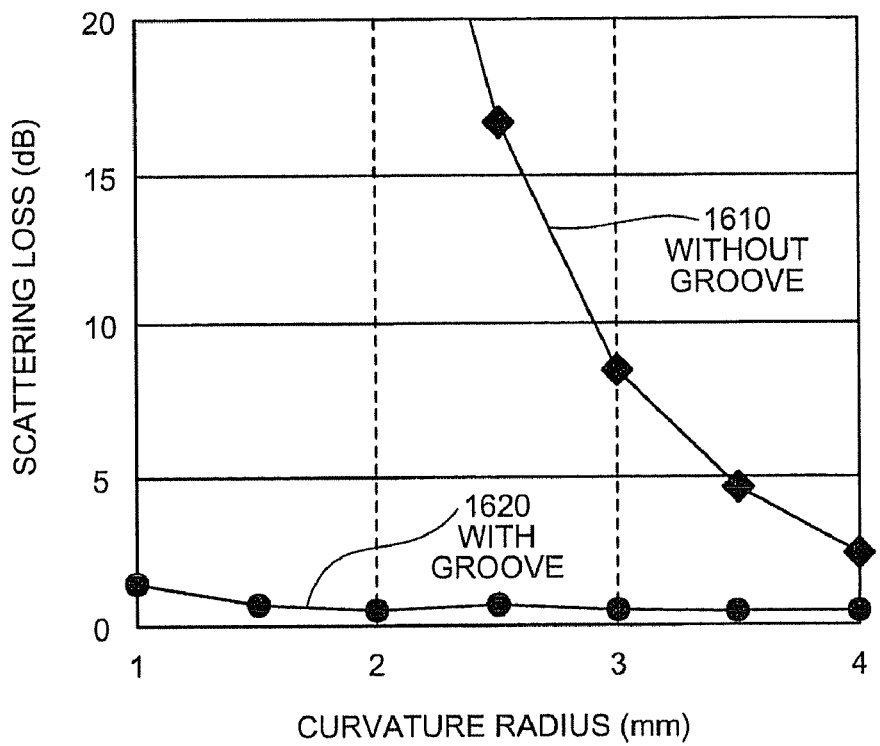
FIG. 16 is a graph depicting the relation between curvature radiuses of a folded part and scattering loss of light.

FIG. 16 is a graph depicting the relation between curvature radiuses of a folded part and scattering loss of light. The horizontal axis in the graph depicted in FIG. 16 indicates the curvature radius (mm) of the folded waveguide 911. The vertical axis indicates the scattering loss (dB) of light passing through the folded waveguide 911. In the optical device 100 depicted in FIG. 15, the dummy waveguide 920 remains inside the folded waveguide 911.

Therefore, if the curvature radius of the folded waveguide 911 is large, scattering loss of light by the dummy waveguide 920 occurs. Curve 1610 indicates the relation between curvature radius of the folded waveguide 911 and scattering loss of light when the groove 1011 is not disposed. Curve 1620 indicates the relation between curvature radius of the folded waveguide 911 and scattering loss of light when the groove 1011 is disposed.

As indicated by curve 1610 and curve 1620, when the curvature radius of the folded waveguide 911 is equal to or less than 4 mm, the effect of reducing the scattering loss of light obtained by disposing the groove 1011 is significant. Therefore, by setting the curvature radius of the folded waveguide 911 to 4 mm or less, miniaturization of the optical device 100 can be achieved while suppressing the scattering loss of light.

As described, according to the manufacturing method of the optical device 100 according to the third embodiment, even in a configuration in which the folded part 910 is arranged in the parallel waveguides 122B, by arranging the grooves 1011 and 1012 along the folded waveguides 911 and 912 each forming the folded part 901, damage of the optical waveguide 120 due to electrical discharge caused at the time of manufacturing a device can be prevented while achieving miniaturization of a device and reduction of optical loss, similarly to the manufacturing method of the optical device 100 according to the first embodiment.

Figure 17:
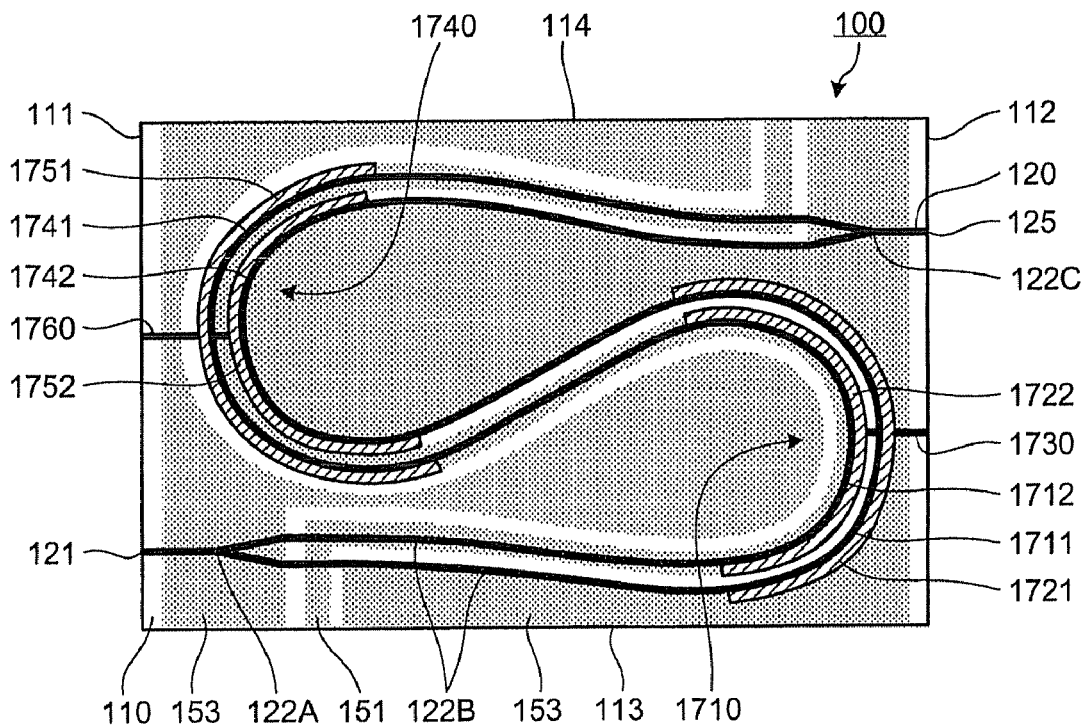
FIG. 17 is a plan view of an optical device according to a fourth embodiment.

FIG. 17 is a plan view of an optical device according to a fourth embodiment of the present invention. In FIG. 17, structures identical to those depicted in FIG. 10 are given the same reference numerals, and explanation therefor is omitted. In the optical device 100 according to the fourth embodiment, the parallel waveguides 122B of the first modulating unit 122 have at least two folded parts.

Specifically, the parallel waveguides 122B have a folded part 1710 near the end 112. A portion of an outer waveguide that is among the parallel waveguides 122B and forming the folded part 1710 is referred to as a folded waveguide 1711. On the other hand, a portion of an inner waveguide among the parallel waveguides 122B and forming the folded part 1710 is referred to as a folded waveguide 1712. In this example, the folded waveguides 1711 and 1712 are curved in a state where the folded waveguides 1711 and 1712 are parallel to each other.

A groove 1721 is formed on the dielectric substrate 110 along an outer periphery of the folded waveguide 1711. Further, a groove 1722 is formed along an outer periphery of the folded waveguide 1712. A dummy waveguide 1730 is formed from the folded waveguide 1712 to the end 112 crossing the folded waveguide 1711, and is separated by the grooves 1721 and 1722. Therefore, the dummy waveguide 1730 is divided into a portion that connects the groove 1721 and the end 112, and a portion that connects the groove 1722 and the folded part 1711.

The parallel waveguides 122B further have a folded part 1740 near the end 111. A portion of an outer waveguide among the parallel waveguides 122B and forming the folded part 1740 is referred to as a folded waveguide 1741. On the other hand, a portion of an inner waveguide among the parallel waveguides 122B and forming the folded part 1740 is referred to as a folded waveguide 1742. In this example, the folded waveguides 1741 and 1742 are curved in a state where the folded waveguides 1711 and 1712 are parallel to each other.

A groove 1751 is formed on the dielectric substrate 110 along an outer periphery of the folded waveguide 1741. Further, a groove 1752 is formed along an outer periphery of the folded waveguide 1742. A dummy waveguide 1760 is formed from the folded waveguide 1742 to the end 111 crossing the folded waveguide 1741, and is separated by the grooves 1751 and 1752. Therefore, the dummy waveguide 1760 is divided into a portion that connects the groove 1751 and the end 111, and a portion that connects the groove 1752 and the folded part 1741.

In the manufacturing method of this optical device 100, conductor patterns are formed on the dielectric substrate 110 near the end 112 and the end 111, respectively, in the pattern forming process. Further, a waveguide pattern to be the optical waveguide 120 is formed. Moreover, a dummy pattern to be the dummy waveguide 1730 is formed so as to connect that waveguide patterns to be the folded waveguides 1711 and 1712 to a conductor pattern near the end 112.

Furthermore, a dummy pattern to be the dummy waveguide 1760 is formed such that waveguide patterns to be the folded waveguides 1741 and 1742 are connected to a conductor pattern near the end 111. With such an arrangement, pyroelectric charge built up at the waveguide patterns to be the folded waveguides 1711 and 1712 by the pyroelectric effect of the dielectric substrate 110 in the process of performing the heat diffusion processing can be released to the conductor pattern near the end 112 through the dummy pattern.

Furthermore, pyroelectric charge built up at the waveguide patterns to be the folded waveguides 1741 and 1742 by the pyroelectric effect of the dielectric substrate 110 in the process of performing the heat diffusion processing can be released to the conductor pattern near the end 111 through the dummy pattern. Therefore, damage of the optical waveguide 120 due to electrical discharge can be prevented. Subsequently, the groove 1721 is formed along an outer periphery of the folded waveguide 1711. Further, the groove 1722 is formed along an outer periphery of the folded waveguide 1712.

Thereafter, the dielectric substrate 110 is cut at the end 112 and the end 111, to remove the respective conductor patterns near the end 112 and near the end 111. Further, the buffer layer is arranged on the surface of the dielectric substrate 110, and the signal electrodes 151 and 152 and the ground electrode 153 are formed on the buffer layer. Thus, the optical device 100 depicted in FIG. 17 can be manufactured.

As described, according to the manufacturing method of the optical device 100 according to the fourth embodiment, even in a configuration in which two or more folded parts are arranged in the parallel waveguides 122B, by arranging a dummy pattern at each of the folded parts, and by arranging a groove along an outer periphery of each waveguide at each of the folded parts, damage of the optical waveguide 120 due to electrical discharge caused at the time of manufacturing a device can be prevented while achieving miniaturization of a device and reduction of optical loss, similarly to the manufacturing method of the optical device 100 according to the first embodiment.

Figure 18:
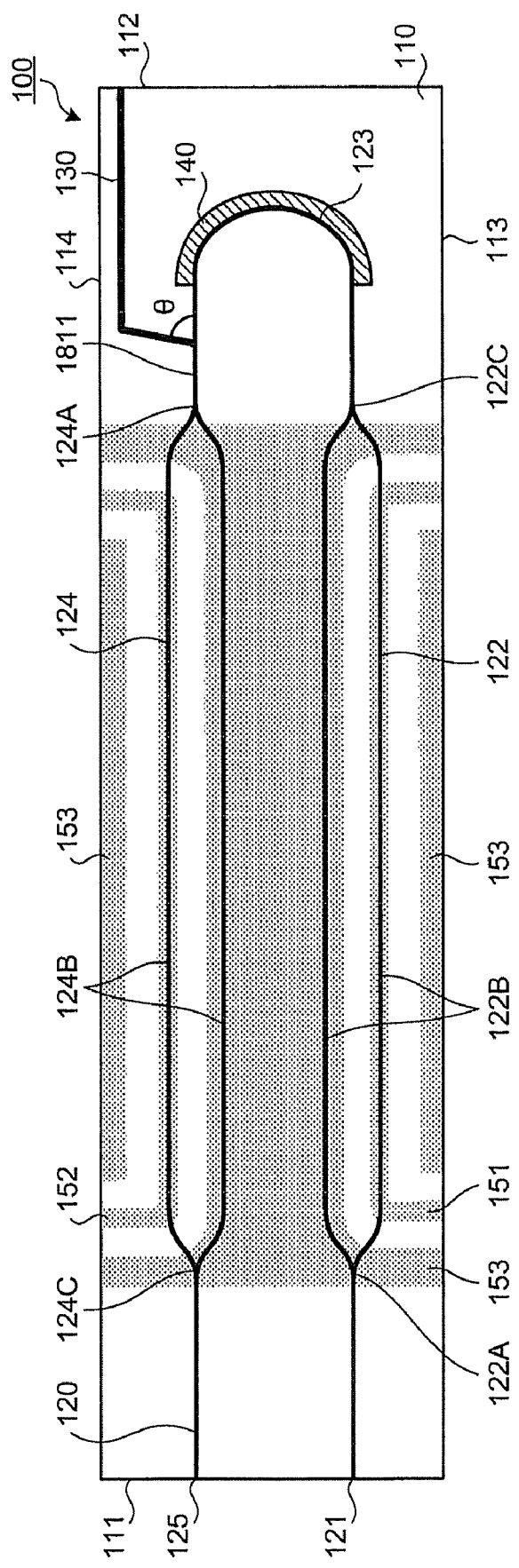
FIG. 18 is a plan view of an optical device according to a fifth embodiment.

FIG. 18 is a plan view of an optical device according to a fifth embodiment of the present invention. In FIG. 18, structures identical to those depicted in FIG. 1 are given the same reference numerals, and explanation therefor is omitted. As depicted in FIG. 18, in the optical device 100 according to the fifth embodiment, the dummy waveguide 130 is formed so as to connect a straight part 1811 near the folded part 123 in the optical waveguide 120 and the end 112 of the dielectric substrate 112.

In the manufacturing method of the optical device 100, a dummy pattern to be the dummy waveguide 130 is formed to connect a pattern to be the straight part 1811 and a conductor pattern near the end 112. Subsequently, a buffer layer is formed on the surface of the dielectric substrate 110. On the buffer layer, the signal electrodes 151 and 152, and the ground electrode 153 are formed. Thus, the optical device 100 depicted in FIG. 18 can be manufactured.

At a connecting part of the straight part and the dummy waveguide 130, if an angle θ between the straight part 1811 and the dummy waveguide 130 is too small, optical loss becomes large. Therefore, it is preferable that the angle θ be 30 degrees or greater. Alternatively, configuration may be such that the width of the dummy waveguide 130 is narrower than the width of the straight part 1811. This enables to reduce combining of light passing through the straight part 1811 with the dummy waveguide 130. Therefore, optical loss can be reduced.

Figure 19:
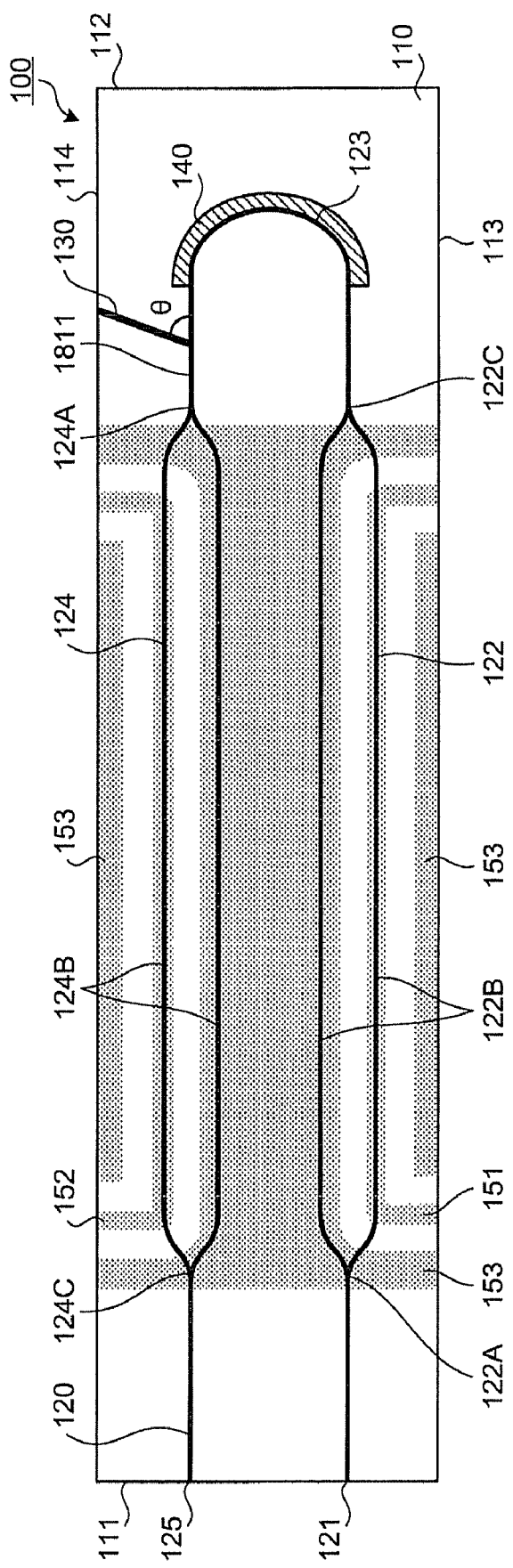
FIG. 19 is a plan view of a first modification of the optical device depicted in FIG. 18.

FIG. 19 is a plan view of a first modification of the optical device depicted in FIG. 18. In FIG. 19, structures identical to those depicted in FIG. 18 are given the same reference numerals, and explanation therefor is omitted. As depicted in FIG. 19, in the optical device 100 according to the fifth embodiment, the dummy waveguide 130 can be arranged to connect the straight part 1811 and the side 114 of the dielectric substrate 110 in the configuration depicted in FIG. 18.

Figure 20:
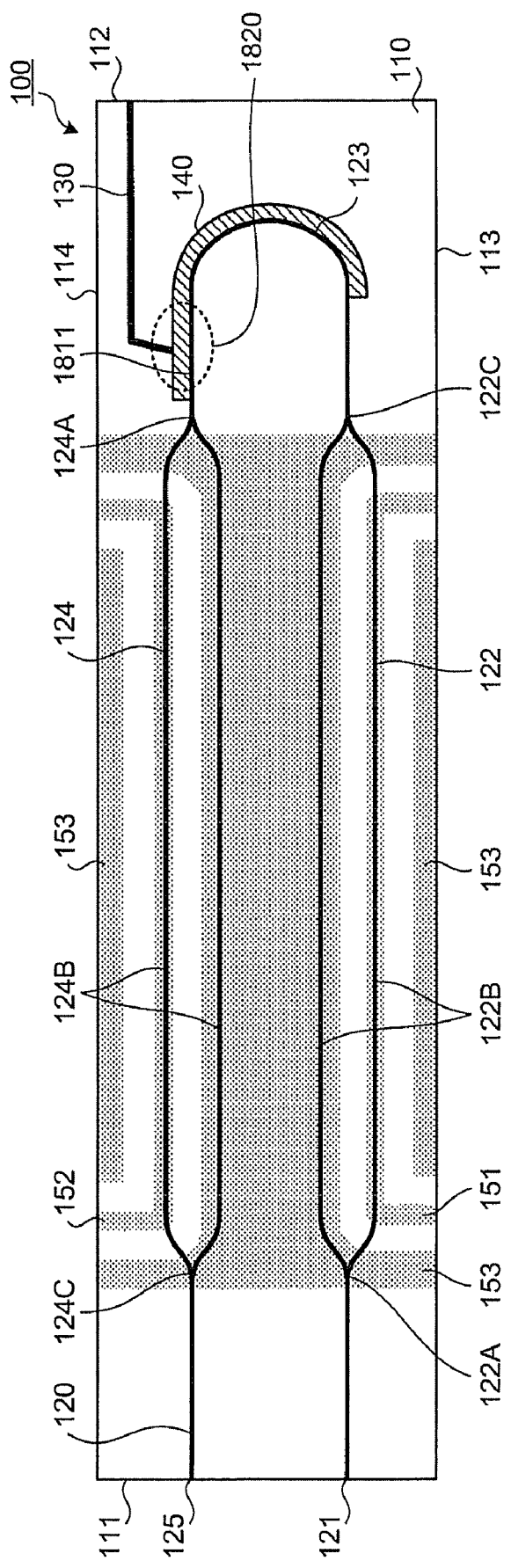
FIG. 20 is a plan view of a second modification of the optical device depicted in FIG. 18.

FIG. 20 is a plan view of a second modification of the optical device depicted in FIG. 18. In FIG. 20, structures identical to those depicted in FIG. 18 are given the same reference numerals, and explanation therefor is omitted. As depicted in FIG. 20, in the optical device 100 according to the fifth embodiment, the groove 140 can be arranged along the folded part 123 and the straight part 1811 of the optical waveguide 120 with respect to the configuration depicted in FIG. 18.

With such an arrangement, the straight part 1811 and the dummy waveguide 130 can be separated by the groove 140. This enables to reduce combining of light passing through the straight part 1811 with the dummy waveguide 130. Therefore, optical loss can be reduced.

Figure 21:
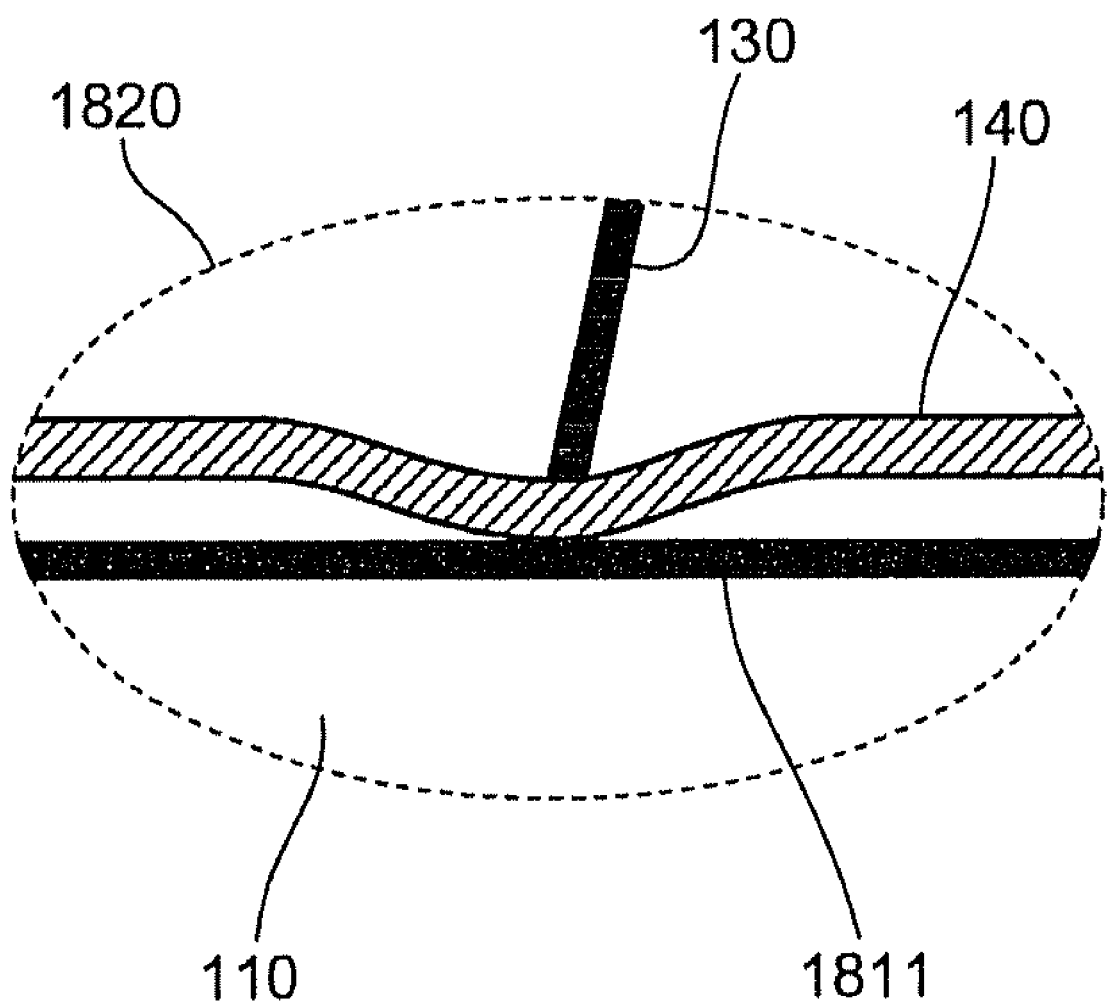
FIG. 21 is an exploded view of a part of the optical device depicted in FIG. 20 encompassed by a dotted circle.

FIG. 21 is an exploded view of a part of the optical device depicted in FIG. 20 encompassed by a dotted circle. In FIG. 21, structures identical to those depicted in FIG. 20 are given the same reference numerals, and explanation therefor is omitted. In the configuration depicted in FIG. 20, if a distance between the straight part 1811 and the groove 140 is short, optical loss occurs in the straight part 1811 due to roughness of the groove 140. To counter this problem, the groove 140 should be formed such that the distance between the straight part 1811 and the groove 140 gradually decreases closer to a connecting portion of the straight part 1811 and the dummy waveguide 130.

This enables to minimize optical loss in the straight part 1811 due to roughness of the groove 140. Further, the groove 140 should be formed such that the distance between the straight part 1811 and the groove 140 becomes 0 at the connecting portion of the straight part 1811 and the dummy waveguide 130. Thus, the straight part 1811 and the groove 140 can be completely separated.

As described, according to the manufacturing method of the optical device according to the fifth embodiment, pyroelectric charge generated near the folded part 123a by the pyroelectric effect of the dielectric substrate 110 in the process of performing the heat diffusion processing on the dielectric substrate 110 on which the waveguide pattern 120a is formed escapes to the conductor pattern 312 (see FIG. 3) through the straight part 1811 and the dummy pattern 130a. Therefore, damage of the optical waveguide 120 due to electrical discharge at the time of manufacturing a device can be prevented.

By disposing the groove 140 along the outer periphery of the folded part 123, even if the curvature of the folded part 123 is large, turning loss of light in the folded part 123 can be reduced. Thus, damage of the optical waveguide 120 caused at the time of manufacturing the optical device 100 due to electrical discharge can be prevented while achieving miniaturization of a device and reduction of optical loss.

Furthermore, by connecting the straight part 1811 and the dummy waveguide 130, by arranging the angle θ between the straight part 1811 and the dummy waveguide 130 to be large (for example, 30 degrees or greater), or by arranging the dummy waveguide 130 to have a width narrower than the width of the straight part 1811, optical loss can be reduced. Alternatively, by separating the straight part 1811 and the dummy waveguide 130 by the groove 140, optical loss can be reduced. Thus, damage of the optical waveguide 120 caused at the time of manufacture of a device due to electrical discharge can be prevented without an increase in optical loss.

Figure 22:
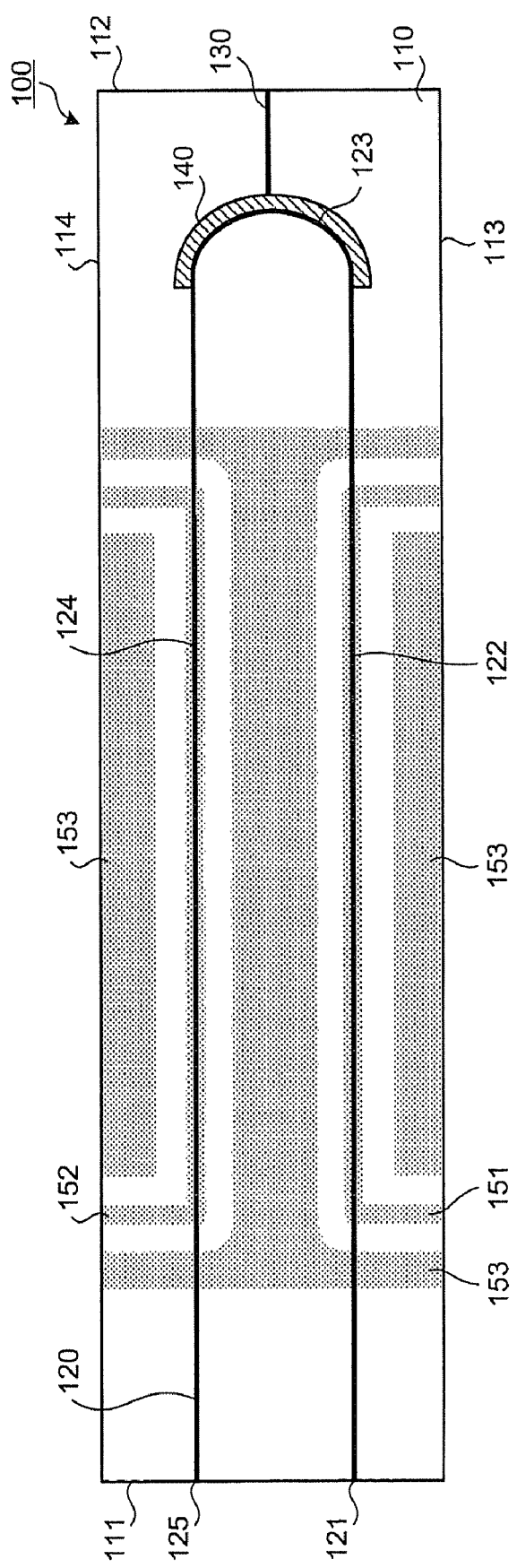
FIG. 22 is a plan view of an optical device according to a sixth embodiment.

FIG. 22 is a plan view of an optical device according to a sixth embodiment. In FIG. 22, structures identical to those depicted in FIG. 1 are given the same reference numerals, and explanation therefor is omitted. While in each of the embodiments described above, a case where the first modulating unit 122 and the second modulating unit 124 of the optical waveguide 20 are of a Mach-Zehnder modulator that includes a branching unit, parallel waveguides, and a combining unit has been explained, each of the modulating units is not limited to a Mach-Zehnder modulator.

As depicted in FIG. 22, in the optical device 100 according to the sixth embodiment, the first modulating unit 122 and the second modulating unit 124 of the optical waveguide 120 are formed into a straight waveguide. The signal electrode 151 is arranged along the first modulating unit 122. The signal electrode 152 is arranged along the second modulating unit 124.

As described, according to the manufacturing method of the optical device 100 according to the sixth embodiment, even with respect to a configuration other than a Mach-Zehnder modulator, it is possible to both prevent damage of the optical waveguide 120 caused at the time of manufacture of the optical device 100 due to electrical discharge and achieve miniaturization of a device and reduction of optical loss.

As described above, according to the manufacturing method of an optical device and the optical device disclosed herein, damage of a device at the time of manufacture due to electrical discharge can be prevented.

Although in each of the embodiments described above, an example has been explained in which a groove (e.g., the groove 140) is formed after pattern formation, the groove can be formed prior to the pattern formation. For example, in the manufacturing process of the optical device 100 according to the first embodiment, the dummy pattern 130a is formed so as to connect the folded part 123a and the conductor pattern 312 after the groove 140 is formed on the surface of the dielectric substrate 110.

With such configuration, pyroelectric charge built up at the folded part 123a by the pyroelectric effect of the dielectric substrate 110 in the process of performing the heat diffusion processing is released to the conductor pattern 312 through the dummy pattern 130a. Therefore, damage of the optical waveguide 120 can be prevented. In this case, because combining of light passing through the folded part 123a with the dummy waveguide 130 is caused, the groove 140 is formed to have sufficient depth.

Furthermore, in each of the embodiments described above, while an example has been explained in which the conductor pattern 312 is removed after the heat diffusion processing is performed on the dielectric substrate 110 on which patterns are formed, the conductor pattern 312 does not have to be removed, or only a part of the conductor pattern 312 may be removed. In this case, in the optical device 100 according to the first embodiment, for example, because the folded part 123 and the dummy waveguide 130 are separated by the groove 140, even if a part of the conductor pattern 312 is left, there is no effect on light passing through the folded part 123.

Moreover, in each of the embodiments described above, while an example in which patterns are formed by Ti diffusion has been explained, pattern formation is not limited to Ti diffusion. For example, the waveguide pattern 120a, the dummy pattern 130a, the conductor patterns 311 and 312, and the like can be formed by proton exchange.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A method of manufacturing an optical device, comprising:
   forming patterns on a dielectric substrate, the patterns including a waveguide pattern having a folded part, a conductor pattern positioned on an outer peripheral side of the folded part, and a dummy pattern that connects the folded part and the conductor pattern;
   performing heat diffusion processing on the dielectric substrate on which the patterns have been formed at the forming, to make the waveguide pattern into an optical waveguide and to make the dummy pattern into a dummy waveguide; and
   forming a groove, on the dielectric substrate, along an outer periphery of the folded part of the optical waveguide formed at the performing so as to separate the optical waveguide and the dummy waveguide.

2. The method of manufacturing according to claim 1, wherein the forming patterns includes forming a plurality of dummy patterns.

3. The method of manufacturing according to claim 1, wherein the forming patterns includes forming the dummy pattern to have a width wider than a width of the waveguide pattern.

4. The method of manufacturing according to claim 1, further comprising cutting, with respect to the dielectric substrate on which the heat diffusion processing has been performed at the performing, a portion in which the conductor pattern has been formed at the forming patterns, to remove the portion.

5. The method of manufacturing according to claim 1, wherein
   the forming patterns includes forming the waveguide pattern to include parallel waveguides respectively having the folded part, and the dummy pattern that connects each of the parallel waveguides to the conductor pattern, and the forming a groove includes forming a first groove along an outer periphery of an outer folded-waveguide among the parallel waveguides, and forming a second groove along an outer periphery of an inner folded-waveguide among the parallel waveguides.

6. The method of manufacturing according to claim 5, wherein the forming a groove further includes forming a third groove along an inner periphery of the inner folded-waveguide.

7. The method of manufacturing according to claim 6, wherein the third groove is formed such that a distance between the outer folded-waveguide and the second groove is equal to a distance between the inner folded-waveguide and the third groove.

8. The method of manufacturing according to claim 6, wherein the third groove is formed such that a distance between the first groove and the second groove is equal to a distance between the second groove and the third groove.

9. The method of manufacturing according to claim 5, further comprising forming a signal electrode on the dielectric substrate along the optical waveguide formed at the performing, wherein the forming a groove includes forming the first groove, the second groove, and a third groove in an entire interacting portion of the optical waveguide and the signal electrode, the third groove being formed along an inner periphery of the inner folded-waveguide.

10. The method of manufacturing according to claim 5, wherein a curvature radius of the outer folded-waveguide is 4 mm or less.

11. The method of manufacturing according to claim 5, wherein the forming patterns includes forming the parallel waveguides to have at least two pairs of parallel folded parts, conductor patterns respectively positioned on an outer peripheral side of each of the pairs of parallel folded parts, and dummy patterns that respectively connect the pairs of parallel folded parts to the conductor patterns, respectively.

12. The method of manufacturing according to claim 11, wherein the forming a groove includes forming the groove along an outer periphery of each of folded part comprising the pairs of parallel folded parts.

13. The method of manufacturing according to claim 1, wherein the forming patterns includes forming the dummy pattern such that the dummy pattern connects a straight part near the folded part in the waveguide pattern to the conductor pattern.

14. The method of manufacturing according to claim 13, wherein the forming patterns includes forming the dummy pattern such that an angle between the straight part and the dummy pattern is 30 degrees or more.

15. The method of manufacturing according to claim 13, wherein the forming patterns includes forming the dummy pattern to have a width narrower than a width of the straight part.

16. The method of manufacturing according to claim 13, further comprising forming a groove on the dielectric substrate along an outer periphery of the straight part and the folded part formed at the forming patterns.

17. The method of manufacturing according to claim 16, wherein the forming a groove includes forming the groove such that a distance between the straight part and the groove gradually decreases to a point of connection between the straight part and the groove.

* * * * *